United States Patent

Grenda et al.

[15] 3,693,019

[45] Sept. 19, 1972

[54] FIBER OPTIC MARK SENSE READ HEAD, MECHANICALLY FREE FROM ELECTRICAL CONNECTIONS

[72] Inventors: Edward P. Grenda, Boston; Jacques Guiguizian, Haverhill; Harold M. Shneider, Weston, all of Mass.

[73] Assignee: Honeywell Inc., Minneapolis, Minn.

[22] Filed: June 16, 1970

[21] Appl. No.: 46,716

[52] U.S. Cl...250/219 D, 235/61.11 E, 250/219 DC, 250/227, 350/96 R

[51] Int. Cl.............................................G01n 21/30

[58] Field of Search.......250/219 R, 219 Q, 219 CR, 250/219 D, 219 DC, 219 DD, 227; 350/96; 235/61.11 R, 61.11 E

[56] References Cited

UNITED STATES PATENTS

| | | | |
|---|---|---|---|
| 3,235,672 | 2/1966 | Beguin | 250/227 X |
| 3,566,083 | 2/1971 | McMillin | 250/227 X |
| 3,549,895 | 12/1970 | Sidorsky | 250/219 D |
| 3,213,179 | 10/1965 | Clauson | 250/219 DC |
| 3,509,354 | 4/1970 | Reilly | 250/219 D |

*Primary Examiner*—James W. Lawrence
*Assistant Examiner*—D. C. Nelms
*Attorney*—Fred Jacob and Leo Stanger

[57] ABSTRACT

In a mark sense card reader having a read head with light sensitive elements therein, a novel construction is provided whereby the head may be pivotable away from the reading station for easy access for cleaning or repair. The head is free from electrical connections to the card holding tray and reading station to prevent problems arising from bending or twisting electrical connections.

9 Claims, 3 Drawing Figures

HAROLD M. SHNEIDER
EDWARD P. GRENDA
JACQUES GUIGUIZIAN
INVENTORS

BY Anthony J. Sarli Jr.
ATTORNEY

FIBER OPTIC MARK SENSE READ HEAD, MECHANICALLY FREE FROM ELECTRICAL CONNECTIONS

BACKGROUND OF THE INVENTION

The present invention relates generally to card readers and more particularly to mark sense card readers of the type in which a card with a plurality of columns and rows of spaces is provided, the columns representing data characters and the rows representing individual digits of the data character. In such devices, a plurality of light sensitive devices, one for each row of the card, sends light reflected from a light source by the card onto a further sensitive device, the outputs of which are amplified into pulse groups representing data characters for further use by an external device such as a data processing unit.

DESCRIPTION OF THE PRIOR ART

In the past, devices have been proposed for reading mark sense cards, such as cards marked with pencil marks, the markings representing digital information to be used by a data processing device.

In such devices, a reading station and associated reading head are required to sense the pencil or other manual markings on the card. Since it is convenient, particularly in low speed card readers, to have the card facing upward where it is in view of the operator, the sensing head has been located above the card in such a manner that the areas of the head adjacent to the card are inaccessable for repair. If a pivotable head were provided, the cleaning operation would be easier, but the electrical connections to provide light to the head and to receive sensed information from the head for the card reader logic, would be subjected to bending and twisting which would ultimately result in failure of the electrical connections.

SUMMARY OF THE INVENTION

The present invention includes a mark sense card reading device using a fiber optic sensing head which is pivotable above the reading station to expose the light receiving portions of the head for easy cleaning or repair. The head is pivotable in such a manner, and with such associated structure, that no electrical wires or connections need be twisted or bent, by providing a mechanical light path interface between the body of the card reader and the sensing head such that light produced in the card reader body is transmitted to the ends of fiber optic bundles located in the head and are retransmitted from the opposite ends of the fiber optic bundle through another optical interface to a plurality of light sensitive devices, such as phototransistors, photodiodes, or the like.

A simple mechanism is further provided for insuring proper alignment of the reading head optical interfaces with the corresponding interfaces on the card reader body.

OBJECTS

It is an object of the instant invention to provide an improved optical mark sense card reader.

A further object of the invention is to provide a fiber optic read head mechanically free from electrical connections.

A further object of the invention is to provide a pivotable read head for a mark sense card reader.

A still further object of the invention is to provide a pivotable reading head with alignment means to insure proper replacement of the reading head.

The foregoing and other objects and advantages of the instant invention will become apparent from the following description of the preferred embodiment when read in conjunction with the drawings contained herewith.

DESCRIPTION OF THE PREFERRED EMBODIMENT

Figures 1, 2, 3:
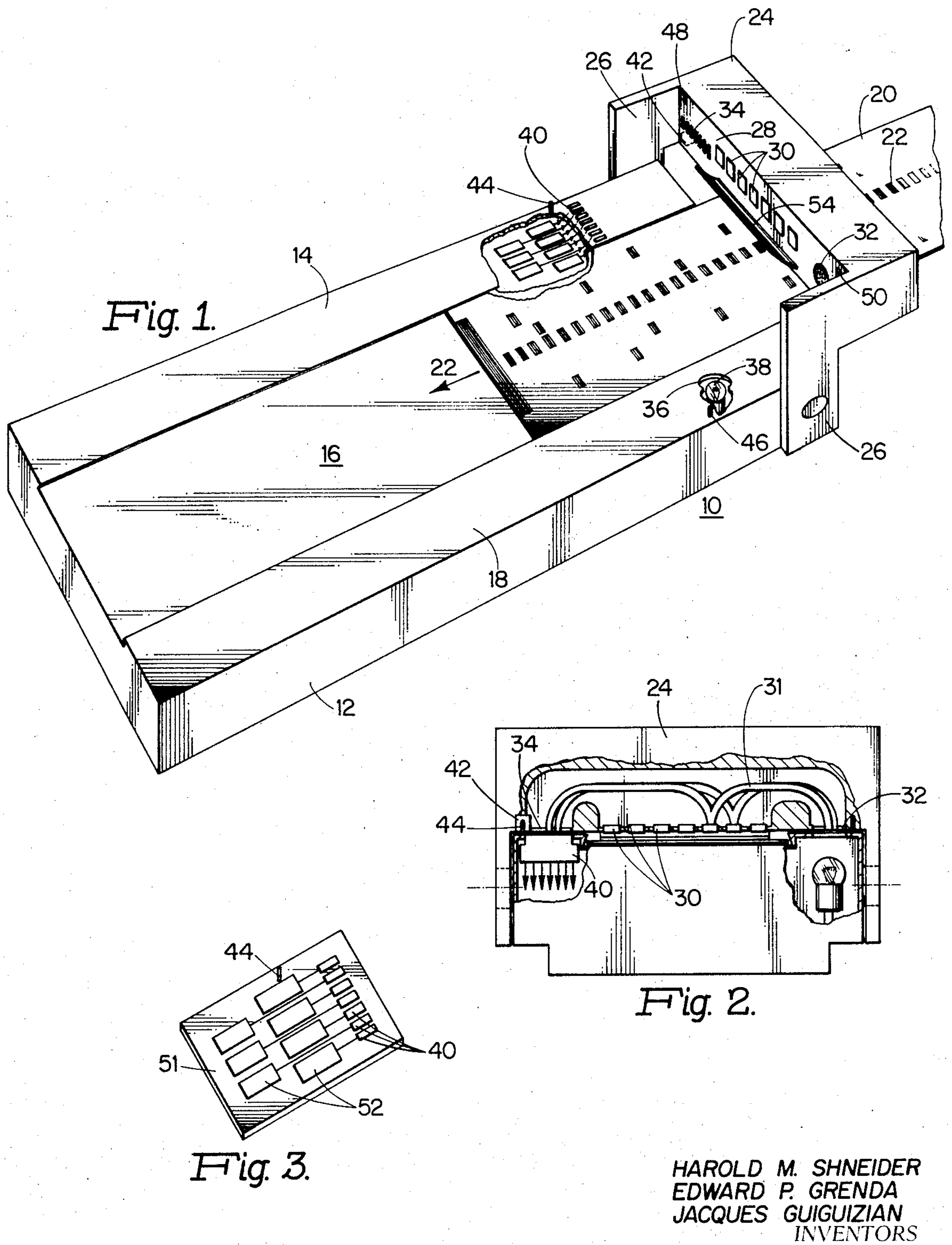
FIG. 1 is a perspective view of a card reader according to the instant invention showing a pivotable sensing head in an open or an inoperative position.
FIG. 2 is a cross-sectional view of the pivotable read head and its associated card reader chassis construction in the area of the read head.
FIG. 3 is a diagrammatic representation of a printed circuit board for use in the invention.

FIG. 1 shows, at 10, a card reader employing the several features of the instant invention.

The card reader 10 generally comprises a rectangular chassis 12 having top surfaces 14, 16 and 18, surface 16 being somewhat recessed beneath the planes of surfaces 14 and 18, to form a channel through which a card 20 is driven by means not shown, in a direction as indicated by arrow 22.

The card 20 may have a plurality of rows and columns of spaces upon which data is encoded by darkening individual spaces of a column to form a data character. There may be any convenient number of columns forming a data record across the length of the card.

For purposes of illustration, card 20 contains one row of spaces 22 which is darkened at its intersection with each of the columns to form a timing track which will be used in conjunction with the operation of the reading logic of the device.

A card which may be used in the instant invention, together with the reading logic associated with the reader of the invention is disclosed in U.S. Pat. Application Ser. No. 46,715 filed on even data herewith, and assigned to the assignee of the instant invention. To the extent that the disclosure of the aforementioned application is necessary to the understanding of the instant invention, the portions of that specification so necessary are incorporated herein.

As card 20 passes through the card reader, it passes beneath a reading head 24 which may be attached by flanges 26 to the side of the reader chassis such that it may be pivoted upward, as shown in FIG. 1, to expose a reading surface 28, for cleaning or repair. In operation, the head 24 will be pivoted through approximately 90° such that sensing elements 30 will lie adjacent the card 20 as it passes through the reader.

Reading head 24 contains a plurality of fiber optic bundles which originate at an interface 32. The bundles are more clearly shown in FIG. 2 which is a cross section view of the reading head and card reader chassis. The bundles 31 may be, for example, 7 in number, and may pass from the origin 32 to the sensing interfaces 30 to an output interface 34, which will have 7 discrete segments corresponding to each of the 7 sensing interfaces 30.

Surface 18 of the reader chassis contains a hole 36 under which is mounted a light bulb or lamp 38. When the reading head is in its operating position, the hole 36 falls just beneath the origin of the light transmitting bundles. Surface 14 of the reader chassis contains, flush with the surface, a plurality of light sensitive devices indicated generally at 40. When the head 24 is in its operating position, the light sensitive devices, which may be phototransistors, will be immediately adjacent the interface formed by the bends of the fiber optic bundles as shown at 34. It can be seen, that in operation, light from the lamp 38 passes through hole 36 to the origin of the light bundles 31 and 32. The light is transmitted through the bundles 31 (only one of which is shown in dashed lines in FIG. 2) to the card reading interface 30. Each of the 7 bundle ends will emit light toward the card which is reflected by the card back to the bundle receptors which then pass to interface 34 and thence to photosensitive devices 40, which photosensitive devices produce signals proportional to the amount of light received by them. Since the card 20 contains markings according to a data code, the light received by photosensitive devices will cause the production of 7 channels of information consisting of pulse streams to be interpreted by card reader logic shown in the aforementioned copending application.

It should be noted that the head, when pivoted to the position shown in FIG. 1 exposes the reading surface 28 of the head to the operator for easy repair or cleaning. Further, even though the head is pivotable to the position shown in FIG. 1, there are no electrical connections which are subjected to twisting or bending stresses which may lead to ultimate failure of the connections.

A permanent magnet 42 may be used to maintain the head in its closed or reading position such that no operator adjustment of fasteners or the like is required.

Further shown in FIG. 1 is a card hold-down tab 54 which, when the head 24 is in operating position, serves to hold the card 20 flat against surface 16 to prevent distortion of the card as it passes under the reading head. A description of such a tab 54 may be found in U.S. Pat. Application Ser. No. 46,715, filed on even date herewith, and assigned to the assignee of the instant invention.

FIG. 1 further shows, mounted on surfaces 14 and 18, a pair of guiding pins 44 and 46, respectively. The guiding pins are arranged to mate with holes 48 and 50 contained in the reading head 24 to accurately position the interface 34 with the light sensitive devices 40, and the bundle origin 32 with hole 36, respectively.

FIG. 3 shows a printed circuit board which may be used with the instant invention. The light sensitive devices are shown generally at 40, which are connected to a plurality of amplifiers 52, the outputs of which, not shown, are fed to the reader logic circuitry, not shown. On the board of FIG. 3 is the pin 44 which may be placed on the board during the manufacturing operation to accurately position the pin with respect to the light sensitive elements 40. When the board 51 is mounted in position on the under side of surface 14 of the reader, the pin 44 passes through a hole in surface 14 and serves as an alignment guide when head 24 is moved into its operating position. In a like manner, hole 48 in head 24 may be accurately positioned with respect to interface 34, during the manufacturing operation.

The accurate positioning of pin 44 and mating hole 48 together with pin 46 and hole 50, which may be constructed in a like manner, allows the reading head 24 to be freely pivoted out of position for cleaning, and replaced with assurance that all the light interfaces will properly align with the card reader body so as to eliminate error generation which may be caused by improper mating.

While in accordance with provisions of the statutes, there has been illustrated and described the best form of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. A card reader comprising:

a. a support having a reading station across which a card to be read travels, b. said support having a light source thereon, c. said support having light sensitive elements mounted thereon, d. a reading head having a reading surface containing light transmission means, e. said reading head being pivotably mounted, with respect to said support, such that said reading surface is adjacent said reading station in an operating position whereby the light transmission means provides a light path from the light source, through the reading head, to the light sensitive elements, f. said reading head being pivotable away from said reading station in a non-operating condition whereby said light path may be interrupted.

2. A card reader as set forth in claim 1 wherein said light transmission means further comprises a reading interface, whereby light passing from said light source through said light transmission means is reflected from a card on said reading station, reenters said light transmission means and is directed to said light sensitive elements.

3. A card reader as set forth in claim 1 wherein said light transmission means has an origin and an output interface.

4. A card reader as set forth in claim 3 wherein said light source is positioned adjacent said origin of said light transmission means and said light sensitive means is positioned adjacent said output interface when said reading head is in an operating position.

5. A card reader as set forth in claim 4, further comprising alignment means for providing proper alignment between said light sensitive means and said output interface.

6. A card reader as set forth in claim 5 further comprising a support member for said light sensitive means, said alignment means secured to said support member.

7. A card reader as set forth in claim 4 wherein said light transmission means are fiber optic bundles.

8. A card reader as set forth in claim 7 wherein said light sensitive means are phototransisters.

9. A card reader as set forth in claim 7 wherein said fiber optic bundles contain a reading interface adjacent said reading station and aligned with portions of a card to be read, said reading interface directing said light from said source to said card and receiving reflections of light from said card.

* * * * *